United States Patent [19]

Hemme

[11] Patent Number: 4,734,620

[45] Date of Patent: Mar. 29, 1988

[54] RESONANT DEGAUSSING APPARATUS

[75] Inventor: Juergen F. Hemme, Meilen, Switzerland

[73] Assignee: RCA Corporation, Princeton, N.J.

[21] Appl. No.: 79,322

[22] Filed: Jul. 30, 1987

[30] Foreign Application Priority Data

Mar. 13, 1987 [GB] United Kingdom ............... 8705956

[51] Int. Cl.⁴ .......................................... H01J 29/06
[52] U.S. Cl. ......................................... 315/8; 315/1; 315/244; 361/267
[58] Field of Search .................. 361/150, 267; 315/8

[56] References Cited

U.S. PATENT DOCUMENTS

| | | | |
|---|---|---|---|
| 3,733,524 | 5/1973 | Cooksey et al. | 361/150 |
| 4,384,313 | 5/1983 | Steingroever et al. | 361/267 |
| 4,489,253 | 12/1984 | Godawski | 315/8 |
| 4,535,270 | 8/1985 | Frantz et al. | 315/8 |
| 4,636,911 | 1/1987 | Truskalo | 361/150 |

Primary Examiner—Harold Dixon
Attorney, Agent, or Firm—Eugene M. Whitacre; Joseph J. Laks; Sammy S. Henig

[57] ABSTRACT

First and second capacitors are charged prior to a degaussing interval. A first switch couples the first capacitor to a degaussing coil to initiate the degaussing interval. The first capacitor and the degaussing coil form a resonant circuit that resonates to generate a decaying degaussing current. During a predetermined portion of each cycle of the degaussing current, a second switch couples a precharged second capacitor in parallel with the first capacitor to form a charge transfer arrangement that transfers charge from the second to the first capacitor for replenishing energy losses in the first capacitor. The charge transfer arrangement increases the duration of the time it takes to the amplitude of the degaussing current to decay and, hence, the length of the degaussing interval.

10 Claims, 6 Drawing Figures

RESONANT DEGAUSSING APPARATUS

This invention relates to degaussing circuits for video display equipment.

Color cathode ray tubes require periodic degaussing or demagnetization to counteract the effects of the earth's magnetic field or of electromagnetic fields produced by nearby electrical devices, such as motors or appliances. These fields may magnetize metallic portions of the cathode ray tube, such as the shadow mask, causing a degradation of the color purity of the tube. Video display apparatus, such as television receivers and computer or video display monitors, usually incorporate a degaussing circuit which is operative when the apparatus is energized to produce an alternating current field that decays toward zero in order to demagnetize the metallic components in the vicinity of the tube and of the tube itself.

A common type of degaussing circuit that includes a degaussing coil is powered from the AC line supply, which in the United States has a frequency of 60 Hz. This type of degaussing circuit ordinarily utilizes a positive temperature coefficient resistor, or thermistor, or other temperature sensitive component, which increases in resistance as it heats due to degaussing current flow. This causes the alternating degaussing current to decay in a manner that provides demagnetization of the cathode ray tube metallic components.

Another type of degaussing circuit utilizes a resonant or ring-down degaussing circuit. The resonant degaussing circuit operates by causing a capacitor connected in parallel with the degaussing coil to resonate with the coil in an oscillating manner. The finite Q of the resonant circuit causes the degaussing current to decay in the manner shown in FIG. 5b, for example, to effect demagnetization of the display apparatus metallic parts. The resonant frequency of the degaussing circuit may be of the order of 2 kHz, so that degaussing is completed in less than 5 milliseconds.

Because of the finite Q of the resonant circuit, the duration of a degaussing interval such as interval $T_{DGI}$ of FIG. 5b is limited by the parameters of the resonant circuit. In some degaussing circuit applications, it may be desirable to lengthen the duration of the degaussing interval beyond that obtained from the conventional degaussing resonant circuit in a way that does not have an adverse impact on the cost of, for example, the degaussing coil.

In accordance with an aspect of the invention, a resonant degaussing circuit of a television apparatus includes a degaussing coil, a first switch, and a first capacitance that is precharged prior to a degaussing interval. The first capacitance is coupled to the degaussing coil by said first switch to form with the degaussing coil a resonant circuit that generates a plurality of cycles of a degaussing current in the degaussing coil, during the degaussing interval. A second capacitance is precharged prior to at least one of the plurality of cycles of the degaussing current. A second switch couples the second capacitance to the first capacitance during a predetermined portion of the one cycle of degaussing current to couple charge from the second capacitance to the resonant circuit, during the degaussing interval.

In accordance with another aspect of the invention, a first capacitor is precharged prior to a degaussing interval. A first switch couples the first capacitor to a degaussing coil at a beginning time of the degaussing interval. The first capacitor and the degaussing coil form a resonant circuit that resonates and that generates an AC degaussing current in the degaussing coil. The amplitude of the degaussing current decays during the degaussing interval. During a predetermined portion of a given cycle of the degaussing current, a second switch couples to the first capacitor a second capacitor that is precharged to form a charge transfer arrangement that transfers charge from the second to the first capacitor for augmenting the charge in the first capacitor. In this way, the length of the degaussing interval increases relative to that of a conventional resonant degaussing circuit.

In accordance with yet another aspect of the invention, the second capacitor is coupled to the first capacitor during each cycle of the degaussing current when the degaussing current is close to zero; thereby, disturbance in the degaussing current is reduced.

In accordance with a further aspect of the invention, the switching operation of the second switch is synchronized to the degaussing current using a current sensing transformer in a current path of the degaussing current.

Figure 1:
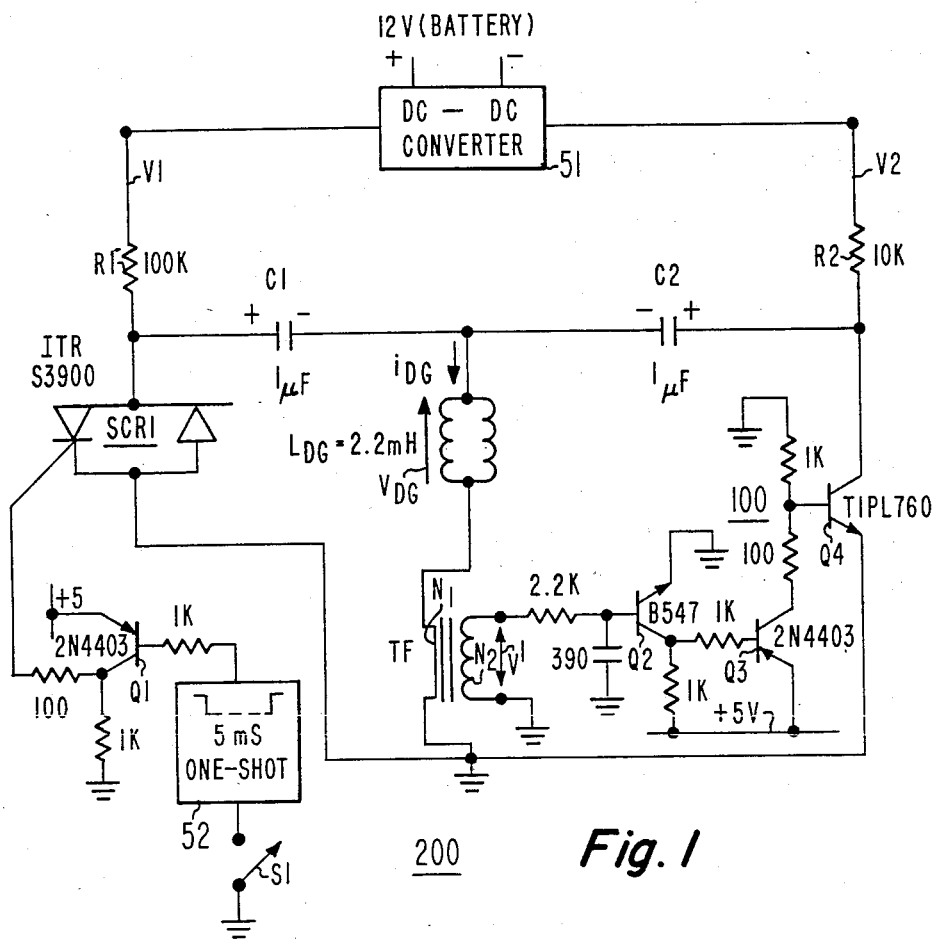
FIG. 1 illustrates a resonant degaussing circuit that includes a charge transfer arrangement, embodying some aspects of the invention, that utilizes a current sensing transformer.

FIG. 1 illustrates a resonant degaussing circuit 200 that includes a charge pump or transfer arrangement 100, embodying some aspects of the invention. Degaussing circuit 200 includes a capacitor C1 that is precharged prior to a degaussing interval, in a polarity shown, from a DC-to-DC converter 51 that generates a DC voltage V1. Voltage V1 is coupled to capacitor C1 through a large resistor R1 and through a DC current path that is formed in a degaussing coil $L_{DG}$.

A switch SCR1, that includes a combination of thyristor and a diode forming an ITR, couples, in a well known manner, capacitor C1 across degaussing coil $L_{DG}$, at a beginning time of a degaussing interval. An example of the way a switch such as switch SCR1 operates is described in U.S. Pat. No. 4,489,253 entitled AUTOMATIC DEGAUSSING CIRCUIT WITH SWITCH MODE POWER SUPPLY in the name of T. J. Godawski.

Switch SCR1 of FIG. 1 is turned on for a duration of, for example, 5 milliseconds by a pulse that is generated by a one-shot flip-flop 52 and that is coupled through a transistor Q1 to the gate of switch SCR1. The maximum current that can flow through resistor R1 is lower than the holding current of switch SCR1. Therefore, after the end of the degaussing interval, switch SCR1 becomes nonconductive that allows capacitor C1 to recharge via resistor R1 that provides the initial conditions for the next degaussing interval. The pulse that turns on switch SCR1 may be generated, in a well known manner, by manually activating a switch such as a switch S1 of FIG. 1 and/or, automatically, each time power is applied to the degaussing circuit.

Figure 5A:
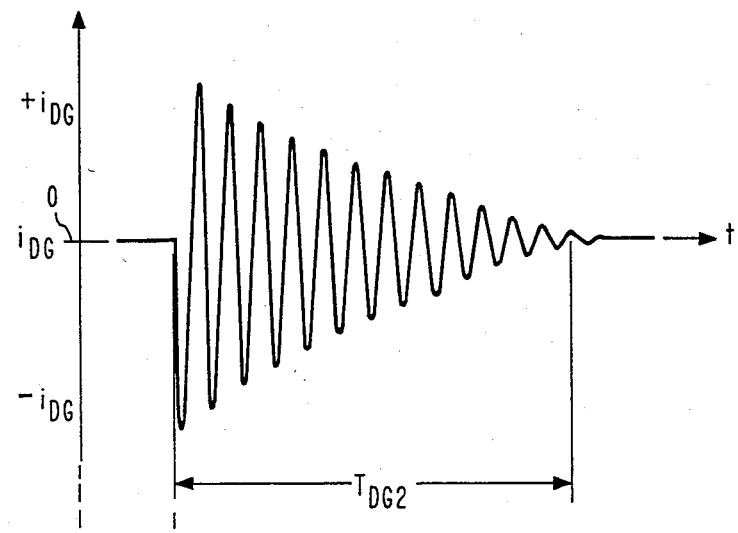
FIG. 5a illustrates the waveform of the degaussing current of the circuit of FIG. 1 when the charge transfer arrangement is included.

Charge transfer arrangement 100 of FIG. 1 includes a capacitor C2 that is precharged prior to, for example, degaussing interval $T_{DG2}$ of FIG. 5a in a polarity shown in FIG. 1 from a voltage V2 produced by converter 51. Voltage V2 may be, for example, equal to voltage V1. Voltage V2 is coupled to capacitor C2 through a resistor R2 and through the current path that is formed by degaussing coil $L_{DG}$.

Figure 4:
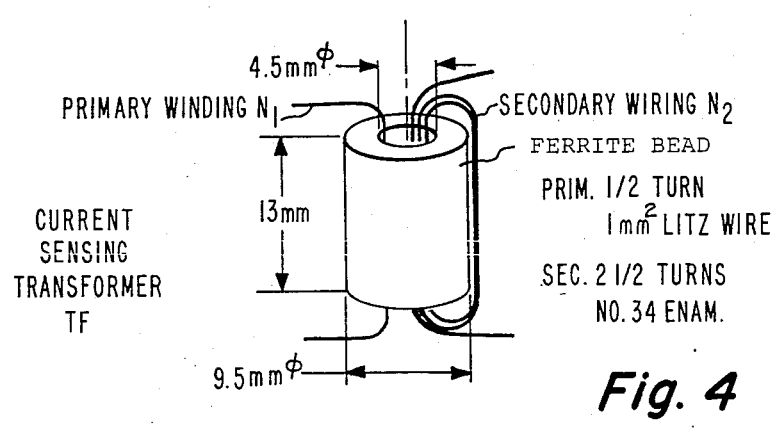
FIG. 4 illustrates the way the current sensing transformer of FIG. 1 is constructed.

In carrying out an aspect of the invention, a current transformer TF having a primary winding $N_1$, that is formed by, for example, a single winding loop around a ferrite core that is constructed in a manner shown in FIG. 4, is coupled in the current path of degaussing current $i_{DG}$ of FIG. 1. Transformer TF generates a positive pulse V' in a secondary winding $N_2$ of FIG. 3 in a positive polarity, as shown in FIG. 1. Pulse V' is generated each time, in a given cycle, when current $i_{DG}$ of FIG. 2 changes from a positive to a negative polarity. Thus, pulse V' of FIG. 3 is generated when voltage $V_{DG}$ across coil $L_{DG}$ of FIG. 1 is at its maximum negative level and current $i_{DG}$ at a maximum rate of change such as at times T, 2T, 3T etc. of FIGS. 2 and 3.

Figures 2, 3:
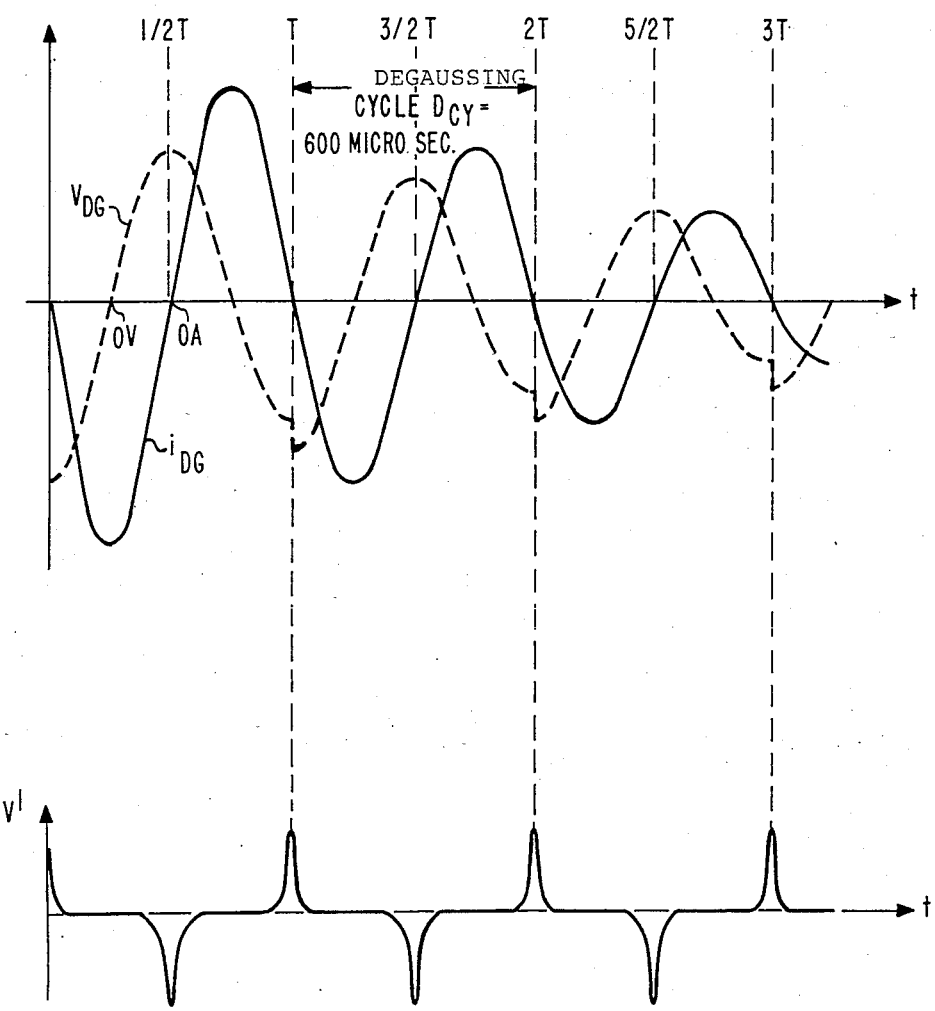
FIG. 2 illustrates an example of waveforms of the current and voltage in a degaussing coil of the circuit of FIG. 1.
FIG. 3 illustrates a waveform of pulses generated by the current sensing transformer of FIG. 1.

Pulse V' is coupled through a pulse shaping and drive arrangement that includes transistors Q2 and Q3 to the base electrode of a transistor switch Q4 to turn on transistor switch Q4 during, for example, a short duration each degaussing cycle $D_{CY}$ of FIG. 2 when voltage $V_{DG}$ is at the maximum negative level. Capacitor C2 of FIG. 1 is precharged prior to, for example, the initiation of the degaussing interval. Capacitor C2 may be precharged, provided the value of resistor R2 is sufficiently small, even during each degaussing cycle $D_{CY}$ of the degaussing interval of FIG. 2 that precedes the current degaussing cycle of current $i_{DG}$ of FIG. 1.

When pulse V' occurs, transistor switch Q4 couples capacitor C2 in parallel with capacitor C1. Consequently, capacitor C2 transfers a charge to capacitor C1 that augments to that already stored in capacitor C1. Therefore, advantageously, by periodically augmenting the charge in capacitor C1 from that stored in capacitor C2, the corresponding duration of degaussing interval $T_{DG2}$ of FIG. 5a that can be obtained for given circuit parameters is longer than if arrangement 100 was not used.

Figure 5B:
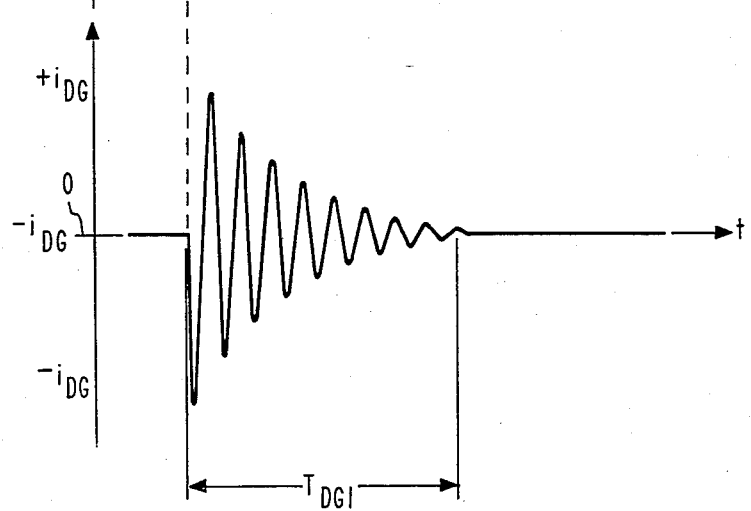
FIG. 5b illustrates, for comparison purpose, the waveform of the degaussing current of the circuit of FIG. 1 when the charge transfer arrangement is disconnected.

Degaussing interval $T_{DG1}$ is shown in FIG. 5b depicts a situation that occurs when transistor switch Q4 of FIG. 1 is removed from the circuit, for explanation purposes. It can be seen that interval $T_{DG1}$ of FIG. 5b is shorter than degaussing interval $T_{DG2}$ of FIG. 5a. Interval $T_{DG2}$ occurs when transistor switch Q4 is included in arrangement 100 of FIG. 1, embodying the invention, that renders arrangement 100 fully operative.

It should be understood that the charge transfer from capacitor C2 to capacitor C1 may be designed to occur, during, for example, a relatively short duration, every half period T of FIG. 2 of current $i_{DG}$ cycle that occurs when degaussing current $i_{DG}$ is zero and when the rate of change of voltage $V_{DG}$ is minimal. Because the coupling of capacitor C2 to the resonant circuit occurs when current $i_{DG}$ is small, the disturbance to degaussing current $i_{DG}$ of FIG. 1 is, advantageously, small. Furthermore, because the duration in which capacitor C2 is coupled to the resonant circuit is short, the resonant frequency remains, advantageously, substantially unaffected.

It should be understood that circuit 200 parameters such as, for example, the polarity and levels of voltages V1 and V2, respectively, the value of resistor R2, and the width of pulse V' may be tailored to fit the particular requirements.

WHAT IS CLAIMED:

1. A resonant degaussing circuit of a television apparatus, comprising:
   a degaussing coil;
   a first switch;
   a first capacitance that is precharged prior to a degaussing interval, said first capacitance being coupled to said degaussing coil by said first switch to form with said degaussing coil a resonant circuit that generates a plurality of cycles of a degaussing current in said degaussing coil, during said degaussing interval;
   a second capacitance that is precharged prior to at least one of said plurality of cycles of said degaussing current; and
   a second switch for coupling said second capacitance to said first capacitance during a predetermined portion of said at least one cycle of said degaussing current to couple charge from said second capacitance to said resonant circuit during said degaussing interval.

2. An apparatus according to claim 1 further comprising, means responsive to said degaussing current for generating a control signal that is coupled to a control terminal of said second switch during said predetermined portion of said cycle that causes said second switch to be conductive during said portion.

3. An apparatus according to claim 2 wherein said control signal generating means comprises a current sensing transformer coupled in a current path of said degaussing current that generates a pulse when said degaussing current changes polarity having a duration that is substantially shorter than that of said cycle of said degaussing current.

4. An apparatus according to claim 1 wherein said second switch is conductive at least once during each cycle of said plurality cycles of said degaussing current.

5. An apparatus according to claim 1 wherein said second switch couples said second capacitance in parallel with said first capacitance to transfer charge from said second to said first capacitance when said second switch is conductive.

6. A circuit according to claim 1 wherein said second capacitance is coupled to said resonant circuit during said predetermined portion that is substantially shorter than that of said degaussing cycle such that the resonant frequency of said resonant circuit is substantially unaffected by said second capacitance.

7. An apparatus according to claim 1 wherein said second capacitance reduces a rate by which an amplitude of degaussing current diminishes.

8. A resonant degaussing circuit of a television apparatus, comprising:
   a degaussing coil;
   a first switch;
   a first capacitance that is precharged prior to a degaussing interval, said first capacitance being coupled to said degaussing coil by said first switch to form with said degaussing coil a resonant circuit that generates, in accordance with a charge that is stored therein, a plurality of cycles of a degaussing current in said degaussing coil during said degaussing interval; and means responsive to said degaussing current for generating a pulse of current that is coupled to said first capacitance during a portion of at least one cycle of said plurality of cycles that augments said charge that is stored in said first capacitance.

9. A resonant degaussing circuit according to claim 8 wherein said pulse of current generating means comprises a current transformer that is coupled in a path of said degaussing current that generates a pulse during said portion, a second switch that is responsive to said pulse and a second capacitance that is coupled to said first capacitor by said second switch when said pulse occurs.

10. A circuit according to claim 9 wherein said current transformer has a primary winding that conducts at least a substantial portion of said degaussing current.

* * * * *